H. M. BRUMSER

Oct. 7, 1930. SCALE Re. 17,819

Original Filed March 9, 1925

Inventor

H. M. BRUMSER

By C. B. Birkenbeuel.

Attorney

Reissued Oct. 7, 1930 Re. 17,819

UNITED STATES PATENT OFFICE

HENRY M. BRUMSER, OF PORTLAND, OREGON, ASSIGNOR TO TOLEDO SCALE COMPANY, OF TOLEDO, OHIO, A CORPORATION OF NEW JERSEY

SCALE

Original No. 1,610,197, dated December 7, 1926, Serial No. 14,109, filed March 9, 1925. Application for reissue filed August 9, 1928. Serial No. 298,588.

This invention relates generally to the assembling of various ingredients in fixed relation to each other, and particularly to means for compounding recipes according to weight.

The first object of this invention is to provide a special form of recipe to be used in conjunction with a scale in which the various weights of the different ingredients required to compound a recipe are given the correct relative position on a printed card or dial.

The second object is to provide a combined recipe and scale in which the chances for errors in combining a given recipe are greatly reduced.

The third object is to expedite the compounding of mixtures of different kinds by indicating the various ingredients required on a card, together with the order in which these elements are required, and any other information which might be desirable in a recipe.

The fourth object is to so construct the scale that it can instantly be changed from a single batch to a double batch recipe compounding device.

The fifth object is to provide a container within the scale itself in which the various recipes can be indexed.

The sixth object is to so construct the device that blank cards may be furnished for the entry of recipes not included in the sold list.

Figure 1:
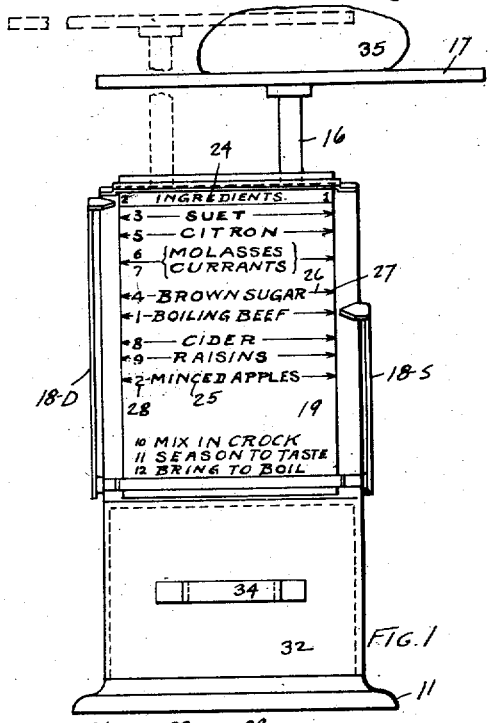
Figure 2:
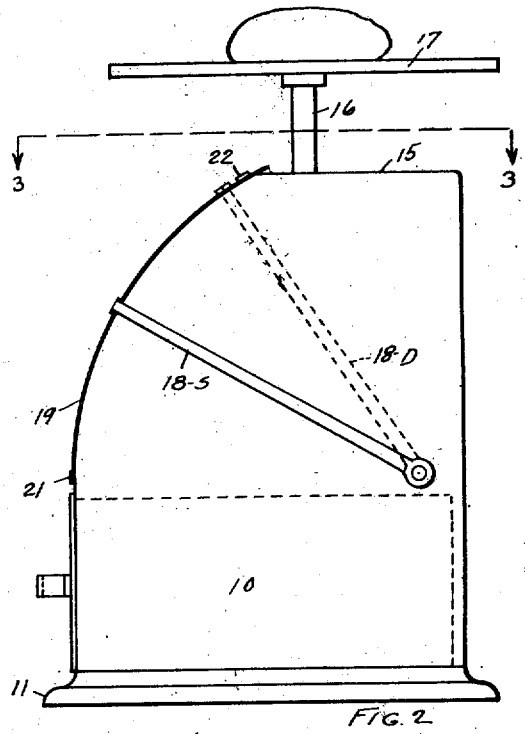
Figure 5:
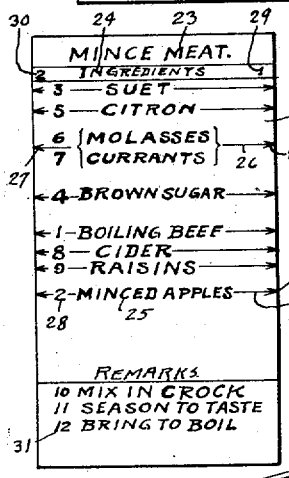
Figure 3:
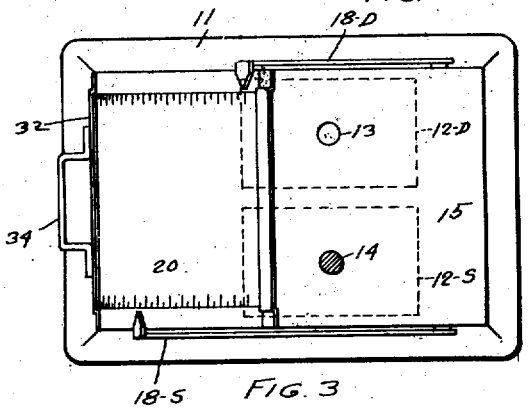
Figure 4:
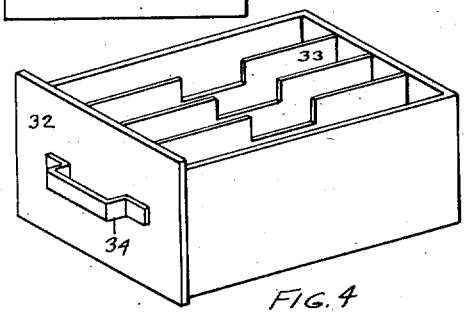

These, and other objects, will become more apparent from the specification following as illustrated in the accompanying drawings, in which:

Figure 1 is a front elevation of the device in use for assembling the ingredients for mince meat. Figure 2 is a side elevation of Figure 1 and Figure 3 is a horizontal section taken along the line 3—3 in Figure 2. Figure 4 is a perspective view of the drawer for the recipe cards. Figure 5 is a front elevation of a representative card.

Similar numbers of reference refer to the same parts throughout the several views.

Referring in detail to the drawing, the device itself consists of a casing 10 mounted on a base 11 on which are mounted two scales of any convenient type whose platforms $12^S$ and $12^D$ are indicated in dotted lines in Figure 3. Openings 13 and 14 are formed in the top 15 adapted to receive the pedestal 16 of an auxiliary platform 17 but not to act as a guide therefor so as to render the friction between the top and pedestal negligible. An indicator $18^S$ actuated from the platform $12^S$ is shown on the right side of the device. An indicator $18^D$ actuated from the platform $12^D$ is shown on the left hand side of the device.

A recipe card 19 is adapted to be placed over the usual dial 20, preferably graduated in ounces. The card 19 is held at its upper and lower ends by means of the lugs 21 and 22 on the case 10. On the card 19 is written or printed a heading 23 underneath which is the word "Ingredients" 24 under which is a list of the ingredients 25, through each of which passes a line 26 provided at each end with an arrow 27. The position of the various arrows 27 on the scale depends entirely upon the weight of the particular ingredient required.

On the left hand side of the column of ingredients, and opposite each of the same, is placed a numeral 28 denoting the order in which the respective ingredients are prepared for assembling. The characters 29 and 30 indicate single and double recipes. In some cases additional numerals 31 may be added to identify and place in their proper order additional steps which may involve the adding of items not usually weighed, or may merely include cautions or instructions.

In this particular instance a drawer 32, preferably provided with dividing partitions 33, and a handle 34 is employed to hold the cards 19 which are not in use. A piece of meat 35 is indicated on the platform 17 for the purpose of better illustrating the operation of this device, which is as follows:

If, for instance, it is desired to prepare some mince meat it is first determined whether a single or double batch is to be made. If the former, the pedestal 16 is placed in the opening 14 so that it can rest upon the platform $12^S$. The various ingredients commencing with the beef, since it is opposite the numeral 1, are now placed on the scale in quantities sufficient to bring the indicator $18^S$ to the respective arrow 27 in each instance.

The exact number of pounds and ounces are not involved in the compounding of this recipe, and possible errors which often arise from the necessity of weighing different items in succession is thereby eliminated.

After all of the elements have been assembled in the order indicated we find, after the numeral 10 "Mix in crock"; after 11 "Season to taste" and after 12 "Bring to boil", which completes the operation. If additional information or caution is desired this may be printed on the rear side of the card, or on spare space on the front side thereof. In some instances the housewife may desire to have some of her own choice recipes included on the cards, and for this purpose blank cards are provided.

It must be understood that any form of scale can be employed with this device and the information recorded on the cards will vary according to the recipe employed and the particular form of recipe. The main object is to provide a scale and a recipe which are used in conjunction with each other and in which it will be unnecessary to deal in pounds and fractions thereof when weighing out a series of materials, but it will only be necessary to weigh out the various materials in quantities which will cause the indicator to come to the point indicated on the card, thereby eliminating entirely the main element in the computation.

It will, of course, be understood that it is not my intention to limit the field of this device to the mere assembling of materials for cooking purposes, but may also be employed for mixing other materials in definite relations where it is desired that this relationship remain unchanged.

In some instances it may be preferable to add to the information on the cards 19 the actual amount of each ingredient required for a recipe in terms in which the particular ingredient is purchased. For instance, cider is not ordinarily purchased by the pound; nor are molasses, milk, etc., and to eliminate confusion in this regard the required values for a single batch would be given in the usual terms used in purchasing these articles.

I claim:

1. The combination of a pair of scales, one of said scales having double the capacity of the other; a platform adapted to be placed on either of said scales; an indicator for each of said scales; a recipe card interchangeably mounted between said indicators, said recipe card having recorded thereon in the order of their weight and in proportional positions on said card a list of the various ingredients required in said recipe in a manner that when the correct amount of any of said ingredients is placed on said platform that the indicator of the scale on which said platform rests will point to the name of the ingredient on said platform.

2. The combination of a casing; a pair of scales enclosed within said casing, each of said scales having an indicator projecting through the side of said casing and movable along the forward edge thereof; a platform adapted to be placed over said casing in a manner to rest on one or the other of said scales; a plurality of recipe cards, interchangeably mounted on said casing behind said indicators adapted to serve as dials for said scale, each of said cards having a recipe recorded thereon whose various ingredients follow each other according to weight; and having a line opposite each of said ingredients, the exact position of each of said lines corresponding with the position of either of said indicators when the amount of material placed on the platform corresponds with the amount required for the particular recipe.

3. In a device of the class described, in combination, automatic weighing mechanism, an automatic indicator operatively connected thereto, a plurality of interchangeable charts each bearing indicia corresponding to proper amounts of ingredients specified in recipes, and means whereby said charts may be selectively mounted for cooperation with said indicator.

HENRY M. BRUMSER.